UNITED STATES PATENT OFFICE.

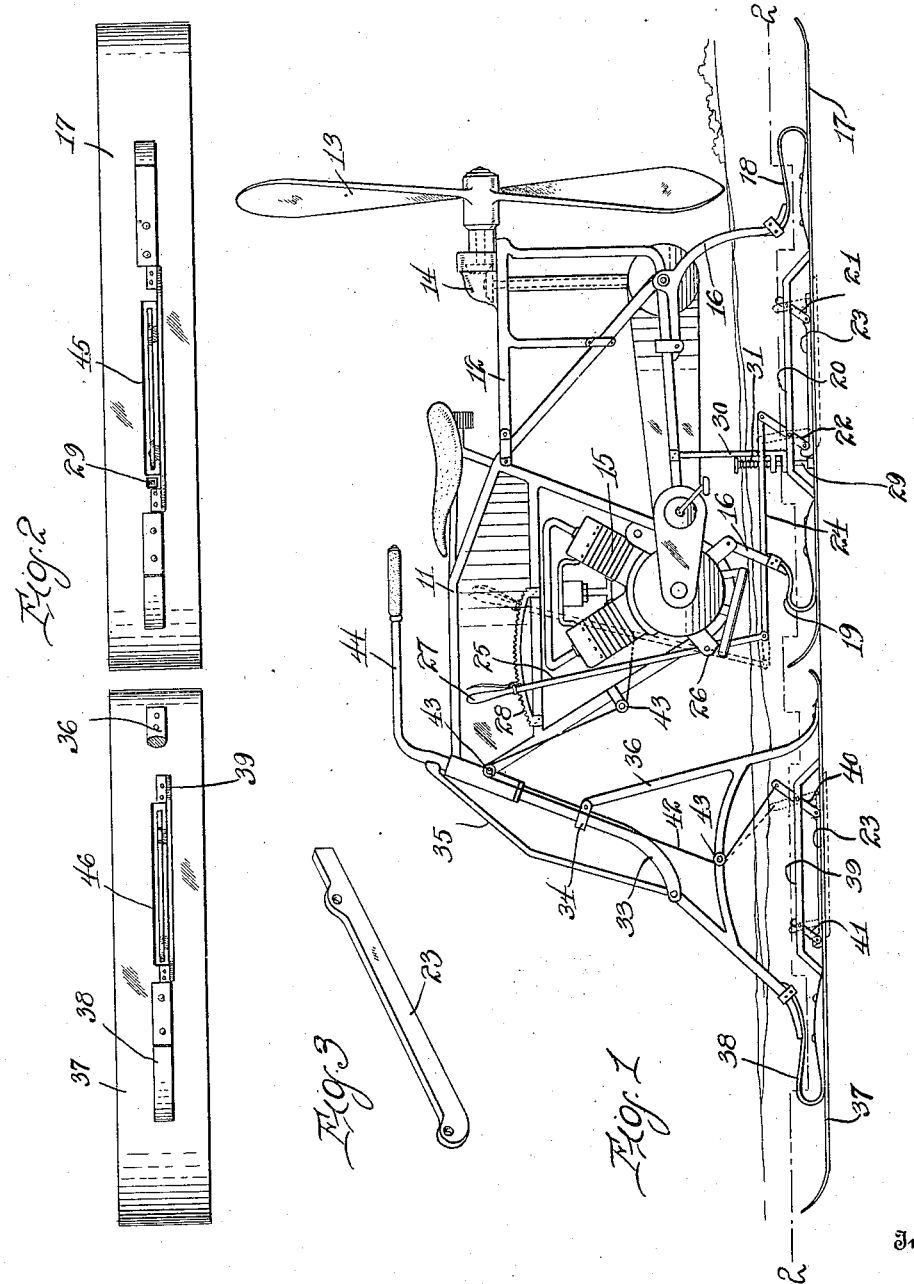

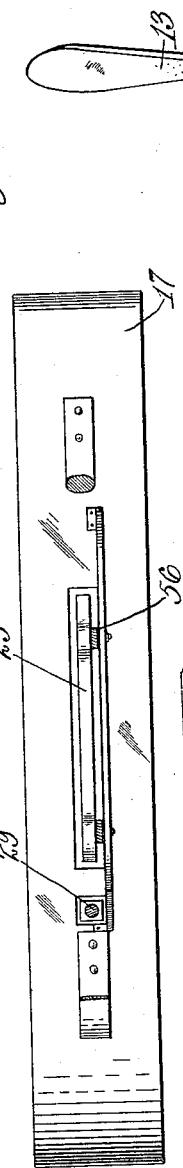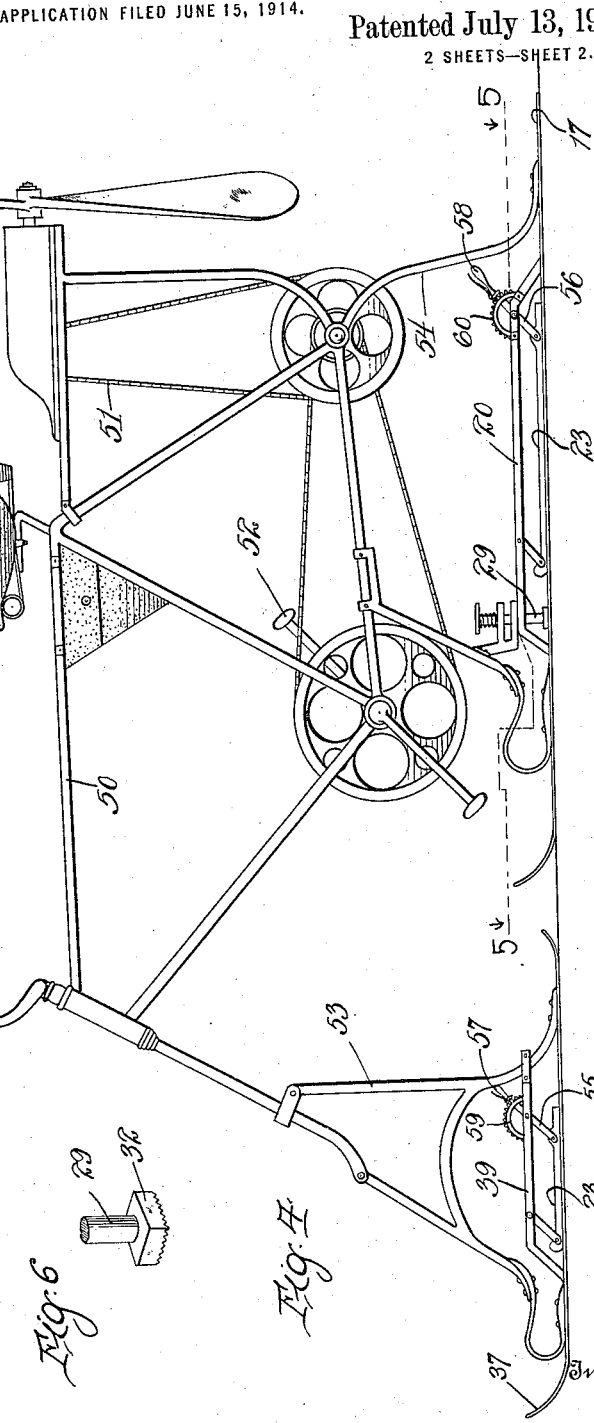

JOHN STEEN, OF SEATTLE, WASHINGTON.

VELOCIPEDE-SLED.

1,146,210. Specification of Letters Patent. Patented July 13, 1915.

Application filed June 15, 1914. Serial No. 845,301.

*To all whom it may concern:*

Be it known that I, JOHN STEEN, a subject of the Emperor of Russia, residing at Seattle, in the county of King and State of Washington, have invented certain new and useful Improvements in Velocipede-Sleds, of which the following is a specification.

The present invention relates to velocipede sleds and has for its object to provide motor operated means whereby the sled may be driven on snow or ice with equal facility as ordinarily on hard ground. For this purpose I attach the propeller in the rear of the vehicle with suitable gear connecting it to the motor on the motor cycle or to the pedals on the bicycle.

The accompanying drawing shows in: Figure 1 the velocipede sled in a side elevation. Fig. 2 a sectional top plan view on line 2—2 of Fig. 1. Fig. 3 is a detail view on a larger scale. Fig. 4 shows the attachment supplied to an ordinary bicycle in side elevation. Fig. 5 is a sectional top plan view on line 5—5 of Fig. 4. Fig. 6 is a perspective view of a brake attachment for the vehicle.

In Fig. 1, 11 is the main frame of the motor cycle with the wheels removed. 12 is the structure on the rear of the machine for supporting the propeller 13 having its axis of revolution placed horizontally, and 14 is the gear for turning the propeller, which gear is suitably connected with the drive of the vehicle actuated by the motor 15. Beneath the frame 11 and securely attached thereto is the sub-structure 16 to which the rear runner 17 is attached by means of springs 18 and 19. On top of the runner is secured a bracket 20 having two short levers 21 and 22 journaled therein. The skate or auxiliary runner 23 is hinged at its forward and rearward ends to the lower end of each of said levers 21 and 22. To the upward extension of the lever 22 is journaled a connecting rod 24 which at its other end is hinged to the actuating bar 25, the latter being mounted to oscillate in the bearing 26 on the main frame 11. The handle 27 of the actuating bar is provided with a pawl ratchet which engages with the ratchet bar 28 also secured on the frame 11. A foot brake 29 is carried in a suitable standard 30 on the frame 11 and held above the ground by means of a spring 31, the lower end of the foot brake being provided with a wide, roughened plate 32 (see Fig. 6) in order to make a good hold in the snow or ice. To the front fork 33 of the vehicle, I attach, in a suitable manner by means of a band 34 and a brace 35, a carrier 36 for the front runner 37. Similar to the rear runner, the front runner is connected to the carrier 36 by means of a spring 38 so that both the front and rear runner will yield when passing over uneven ground. The bracket 39 is secured on top of a front runner 37 in a similar manner as bracket 20 on the rear runner. This bracket forms bearings for the oscillating levers 40, 41 which at their lower ends carry the skate or auxiliary runner 23 and the rear oscillating lever 40 has an upward extension which is connected by means of the chain or wire 42 with the actuating bar 25. This chain or wire 42 runs over rollers 43 which are positioned in such a way, that any turning of the handle bars 44 will not alter the position of the front skate 23, either up or down. Both the rear and the front runners 17 and 37 are provided with longitudinal slits 45 and 46 of about the same length and width as the skates 23 and it will be evident that, on drawing back the handle 27 of the actuating bar 25, the oscillating levers 22 and 40 will be thrown forward and the skates or auxiliary runners 23 pushed down through the slits 45 and 46 so as to protrude beneath the level of the runners 17, 37. It will therefore be seen that for running on a snow covered ground, the runners 17 and 37 will be in operation while the handle 27 is in forward position and the skates 23 retracted above the runners. When it is desired to run the vehicle on ice, the handle 27 is thrown back and the skates, projecting below the runners, will raise them from the ice so that the vehicle runs just as well on snow as on ice.

The attachment illustrated in Figs. 4 and 5 is almost identical to the one already described, but applied to an ordinary bicycle from which the wheels have been removed. Its frame 50 carries a propeller 13 with driving connection 51 to the pedals 52. Front and rear carriers 53 and 54 are also provided for supporting the runners 37 and 17 respectively. The brackets 39 and 20 are arranged in the same manner for supporting the skates 23 as has already been described. In this case however the oscillating levers 55 and 56 are separately operated by the handles 57 and 58 which have rigid engagement with the ratchet bars 59 and 60 respectively so that each skate will have to be adjusted separately and not by a common handle 27 as described in connection with the motor vehicle. The main difference between the two embodiments is therefore that the construction shown in Figs. 1 and 2 permits the rider to shift the skates up and down during running, while in the construction illustrated in Figs. 4 and 5 he has to dismount to change the position of the skates.

I claim:—

1. In a road vehicle, a main frame and a turnable frame mounted thereon, a runner yieldingly mounted on each of said frames, a skate on each of said runners, said runners having apertures registering with said skates, and means for holding the skates above or below the running surface of the runners, whereby the vehicle may selectively run on said skates or said runners.

2. In a road vehicle, a main frame and a turnable frame mounted thereon, a runner yieldingly mounted on each of said frames, a skate on each of said runners, said runners having apertures registering with said skates, and means for holding the skates above or below the running surface of the runners, said holding means comprising levers hinged to the skates and the runners respectively, whereby the vehicle may selectively run on said skates or said runners.

3. In a road vehicle, a main frame and a turnable frame mounted thereon, a runner yieldingly mounted on each of said frames, a skate on each of said runners, said runners having apertures registering with said skates, means for holding the skates above or below the running surface of the runners, said holding means comprising levers hinged to the skates and the runners respectively, and pawl and ratchet members for securing the levers in either position, whereby the vehicle may selectively run on said skates or said runners.

4. In a road vehicle, a main frame and a turnable frame mounted thereon, a runner yieldingly mounted on each of said frames, a skate on each of said runners, said runners having apertures registering with said skates, means for holding the skates above or below the running surface of the runners, said holding means comprising a bracket secured on each runner, a pair of oscillating levers journaled in said bracket, the lower end of each lever being hinged to the respective skate, and pawl and ratchet members for securing the levers in either position, whereby the vehicle may selectively run on said skates or said runners.

5. In a road vehicle, a main frame and a turnable frame mounted thereon, a runner yieldingly mounted on each of said frames, a skate on each of said runners, said runners having apertures registering with said skates, means for holding the skates above or below the running surface of the runners, said holding means comprising a bracket secured on each runner, a pair of oscillating levers journaled in said bracket, the lower end of each lever being hinged to the respective skate, pawl and ratchet members for securing the levers in either position, an actuating bar, said bar being mounted to oscillate in the main frame, a link connecting said bar with one of said oscillating levers for the rear skate, and a flexible wire connection between said bar and one of the levers for the front skate, whereby the vehicle may selectively run on said skates or said runners.

6. In a velocipede having a main frame and a turnable frame mounted thereon, a pair of runners and carriers for attaching the runners to the respective frames, a pair of auxiliary runners swingingly mounted on said first runners.

7. In a velocipede having a main frame and a turnable frame mounted thereon, a pair of runners and carriers for attaching the runners to the respective frames, a pair of auxiliary runners swingingly mounted on said first runners, and means for shifting said auxiliary runners into any of their adjusted positions during traveling.

In testimony whereof I affix my signature in presence of two witnesses.

JOHN STEEN.

Witnesses:
 CARL J. SMITH,
 THOS. A. HARRISON.

Copies of this patent may be obtained for five cents each, by addressing the "Commissioner of Patents, Washington, D. C."